United States Patent
O'Donnell et al.

(10) Patent No.: US 6,563,941 B1
(45) Date of Patent: May 13, 2003

(54) MODEL-BASED REGISTRATION OF CARDIAC CTA AND MR ACQUISITIONS

(75) Inventors: Thomas O'Donnell, Engelwood, NJ (US); Alok Gupta, East Brunswick, NJ (US); Schmuel Aharon, West Windsor, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/460,746

(22) Filed: Dec. 14, 1999

(51) Int. Cl.[7] .................................................. G06T 17/40
(52) U.S. Cl. ........................ 382/131; 382/154; 382/294
(58) Field of Search ................................. 382/131, 154, 382/289, 294; 345/427; 378/4, 21; 600/425

(56) References Cited

U.S. PATENT DOCUMENTS

| | | | |
|---|---|---|---|
| 5,151,856 A | * 9/1992 | Halmann et al. | 600/410 |
| 5,633,951 A | * 5/1997 | Moshfeghi | 382/131 |
| 5,647,360 A | 7/1997 | Bani-Hashemi et al. | 128/653.1 |
| 5,839,440 A | 11/1998 | Liou et al. | 128/654 |
| 5,883,630 A | 3/1999 | O Donnell et al. | 345/420 |
| 5,923,770 A | 7/1999 | O Donnell et al. | 382/131 |
| 6,115,114 A | * 9/2000 | Berg et al. | 356/4.01 |
| 6,175,655 B1 | * 1/2001 | George et al. | 358/451 |

OTHER PUBLICATIONS

Studholme, C., et al., "Automated 3–D Registration of MR and CT Images of the Head," Medical Image Analysis, 1:163–175, 1996.*

Matthias C. Dulce, MD; "Quantification of the Left Ventricular Volumes and Function with Cine MR Imaging: Comparison of Geometric Models with Three–dimensional Data," Cardiac Radiology, vol. 188, pp. 371–376, Aug. 1993.

O Donnell et al.; "Global Models with Parametric Offsets as Applied to Cardiac Motion Recovery," IEEE, pp. 293–299, 1996.

* cited by examiner

Primary Examiner—Brian Werner
Assistant Examiner—Ryan J. Miller
(74) Attorney, Agent, or Firm—Donald B. Paschburg; F. Chau & Associates, LLP

(57) ABSTRACT

A method for registration of magnetic resonance (MR) and computed topography (CT) images, in accordance with the present invention includes providing MR images having a region of interest delineated by first contours and providing CT images having the region of interest delineated by second contours. A pre-existing model of the region of interest is also provided. The pre-existing model is fit to the first contours or the second contours to provide a first resultant model. The first resultant model is then copied to provide a copied model. The copied model is fit to the other of the first contours and the second contours to provide a second resultant model. By rotating and translating the first resultant model and the second resultant model, the first resultant model and the second resultant model are registered. The rotation and translation information are stored and applied to the images to provide registration between the MR images and the CT image

32 Claims, 7 Drawing Sheets

MODEL-BASED REGISTRATION OF CARDIAC CTA AND MR ACQUISITIONS

BACKGROUND

1. Technical Field

This disclosure relates to imaging and more particularly, to a method and apparatus for registering magnetic resonance and CT scan images.

2. Description of the Related Art

Medical imaging of internal organs may be performed by non-invasive imaging procedures, such as computed topography (CT, or "Cat scan") and magnetic resonance (MR) imaging (MRI). These techniques provide useful information about internal organs which may be employed by medical personnel to make important health related decisions about a patients condition.

Although these techniques both provide useful information, each techniques may be limited by the by the type of information the technique can provide. For example, CT imaging provides topographical images of internal structures of tissue. This means the shape or geometry of an internal organ can be determined using the CT procedure. MR imaging on the other hand provides functional information about the tissue comprising the organ or internal structure. For example, MR images may be employed to determine whether tissue is alive or dead for a given internal organ.

Therefore, a need exists for a method and apparatus with the capability of combining MR and CT information for an improved image having both shape and function information about organic structures and tissues.

SUMMARY OF THE INVENTION

A method for registration of magnetic resonance (MR) and computed topography (CT) images, in accordance with the present invention includes providing MR images having a region of interest delineated by first contours and providing CT images having the region of interest delineated by second contours. A pre-existing model of the region of interest is also provided. The pre-existing model is fit to the first contours or the second contours to provide a first resultant model. The first resultant model is then copied to provide a copied model. The copied model is fit to the other of the first contours and the second contours to provide a second resultant model. By rotating and translating the first resultant model and/or the second resultant model, the first resultant model and the second resultant model are registered. The rotation and translation information are stored and applied to the images to provide registration between the MR images and the CT images.

In other methods, the step of providing MR images having a region of interest delineated by first contours preferably includes the step of providing MR images from a plurality of positions. The step of providing MR images having a region of interest delineated by first contours may include the step of manually delineating the region of interest or automatically delineating the region of interest by employing an segmentation algorithm. The step of providing CT images having the region of interest delineated by second contours may include the step of manually delineating the region of interest or automatically delineating the region of interest by employing an segmentation algorithm. The MR images and CT images are preferably acquired from a beating heart. The CT images may be acquired at a rate of greater than or equal to eight images per second.

In still other methods, the step of fitting the preexisting model to one of the first contours and the second contours to provide a first resultant model may include the steps of rigidly translating and rotating the pre-existing model, adjusting global shape parameters of the pre-existing model and conforming a mesh of springs of the pre-existing model to accommodate individual features described by one of the first and second contours. The step of fitting the copied model may include the steps of rigidly translating and rotating the copied model, adjusting global shape parameters of the copied model and conforming a mesh of springs of the copied model to accommodate individual features described by the other of the first and second contours. The method may include the step of determining volumes of features in the MR and CT images by summing voxels in the first and second resultant models, respectively.

A method for registration of magnetic resonance (MR) and computed topography (CT) images, in accordance with the present invention includes providing MR and CT images of a heart, delineating an epicardial surface and an endocardial surface of the heart in the MR and CT images by designating contours on the images and providing a pre-existing heart model. The pre-existing heart model is fit to the contours in the MR images to provide an MR model, and the MR model is copied to provide a copied MR model. The copied MR model is fit to contours in the CR images to provide a CT model. One of the MR model and the CT model are rotated and translated to register the MR model and the CT model. The rotation and translation information are stored, and the rotation and translation information are applied to the MR and CT images to provide registration between the MR images and the CT images.

In other methods, the step of delineating an epicardial surface and an endocardial surface of the heart may includes the step of manually delineating the epicardial surface and the endocardial surface or automatically delineating the epicardial surface and the endocardial surface by employing an segmentation algorithm. The CT images may be acquired at a rate of greater than or equal to eight images per second. The step of fitting the pre-existing model to the contours of the MR images may include the steps of rigidly translating and rotating the pre-existing model, adjusting global shape parameters of the pre-existing model and conforming a mesh of springs of the pre-existing model to accommodate individual features described by the contours in the MR images. The step of fitting the copied MR model to the contours of the CT images may include the steps of rigidly translating and rotating the copied MR model, adjusting global shape parameters of the copied MR model and conforming a mesh of springs of the copied MR model to accommodate individual features described by the contours in the CT images. The step of determining volumes of a left ventricle blood pool and myocardium in the MR and CT images by summing voxels in the MR and CT models, respectively, may be included.

The steps of the present invention may be implemented by a program storage device readable by machine, tangibly embodying a program of instructions executable by the machine to perform method steps for registration of magnetic resonance (MR) and computed topography (CT) images.

A system for registration of magnetic resonance (MR) and computed topography (CT) images, in accordance with the present invention, includes means for delineating an epicardial surface and an endocardial surface of a heart in MR and CT images by designating contours on the images. A pre-existing heart model is employed for fitting to the contours in the MR images to provide an MR model. Means for copying the MR model to provide a copied MR model is included. The copied MR model is fit to contours in the CR images to provide a CT model. Means for rotating and translating the MR model and the CT model to register the MR model and the CT model is included. A memory is employed for storing rotation and translation information such that the rotation and translation information is applied to the MR and CT images to provide registration between the MR images and the CT images, and a display is included for viewing the registered MR images and CT images.

In alternate embodiments, the means for delineating may include a mouse and a graphical user interface. The means for copying may include a processor. The means for rotating and translating may also include a processor. The pre-existing model preferably includes a mesh of springs to accommodate individual features described by the contours in the MR images. The copied MR model may includes a mesh of springs of the copied MR model to accommodate individual features described by the contours in the CT images. The MR and CT models may include voxels for determining volumes in the MR and CT.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

The present invention provides a method and apparatus for combining information and images taken during computed topography angiography (CTA) and magnetic resonance (MR) imaging. The present invention exploits the CTA and MRI techniques to provide a more useful image of internal organs, such as, for example, the heart. In particularly useful embodiments of the present invention, a living heart is imaged by CTA and MRI and the images are registered and merged to provide both structural and functional information about the heart. Advantageously, CTA and MR images applied to the cardiac domain provide both complementary and reinforcing information.

CTA reconstructions employing retrospective gating techniques are of adequate resolution to recover coronary arteries. However, due to the inability of some patients to maintain breath-holds, total spatial coverage is not always possible. MR images, on the other hand, are typically of much lower resolution but can be acquired from arbitrary axes for complete (if sparse) coverage. MR images, in addition, include information relating to the function of the underlying tissue. The present invention provides a novel, clinically viable technique for registering CTA and MR images and thereby couple the high spatial resolution of coronary artery CTA with the myocardial function provided by MRI. The method also provides for the computation of heart chamber volumes.

The present invention will now be described in terms of imaging of the heart. The present invention is much broader, however, and relates to combining any images or image sets taken from different imaging techniques, for example, positron emission tomography (PET) or single photon emission computer tomography (SPECT). It should be understood that the elements shown in FIG. 1 may be implemented in various forms of hardware, software or combinations thereof. Preferably, these elements are implemented on one or more appropriately programmed general purpose digital computers having a processor and memory and input/output interfaces.

Figure 1:
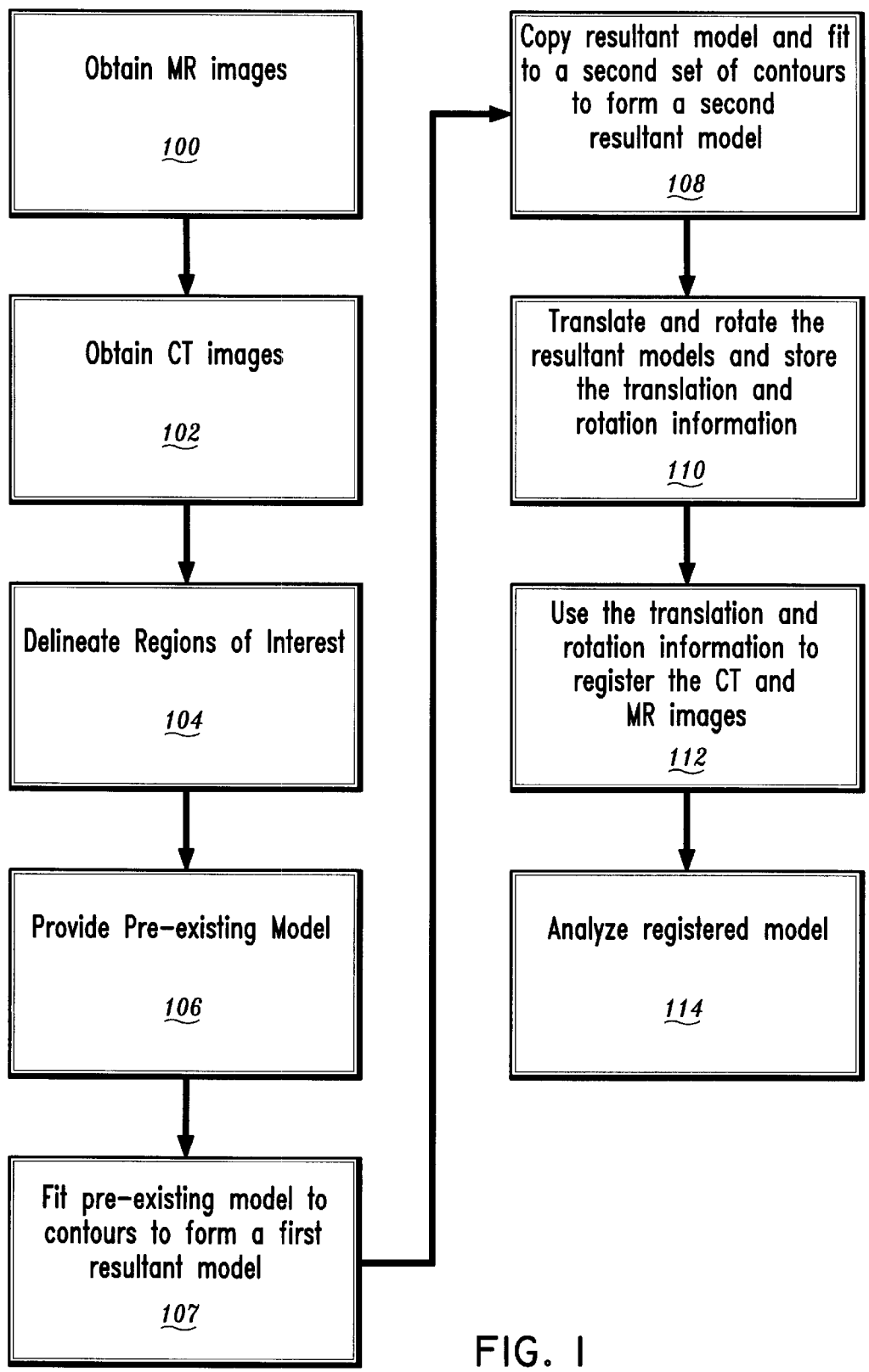
FIG. 1 is a block/flow diagram showing a system/method for registration of MR and CT images in accordance with the present invention.

Referring now in specific detail to the drawings in which like reference numerals identify similar or identical elements throughout the several views, and initially to FIG. 1, a block/flow diagram for a system/method of the present invention is shown. In block 100, a magnetic resonance image (MRI) of a myocardial region is obtained by employing a MRI device, such as, for example, a 1.5 T Symphony MR scanner, commercially available form Siemens Aktiengesellschaft. Data is collected for an image of the myocardial region and stored for further processing as will be described. Other organs or internal structures may also be imaged. Multiple images are preferably obtained from different locations to provide as complete a three dimensional image of the cardial region as possible. However, the present invention may also be employed to view a particular location or area of a heart. In this case, the number of images may be fewer or the images may be focused about a particular region of interest. In one embodiment about 10 images, each from a different position are employed to construct a three dimensional model of the cardial region.

In block 102, a computed topography acquisition (CTA) of a myocardial region is obtained by employing a CT device, such as, for example, a SOMATOM scanner, commercially available form Siemens Aktiengesellschaft. Data is collected for a time dependent image of the same myocardial region as imaged by CT and stored for further processing as will be described. Other organs or internal structures may also be imaged. Multiple images are preferably obtained at a rate of about eight images per second. Higher rates are preferred; however, lower rates may also be employed. Since the heart in a normal human beats 60–70 times per minute, high sample rates are preferred for this organ. With higher sample rates, heart images are advantageously provided with higher resolution and a three dimensional image of the myocardial region is achieved and stored with greater accuracy. The images are employed to construct a three dimensional model of the myocardial region or a portion thereof.

In block 104, CT and MR images include more information than is needed. For analysis of a heart, since the CT and MR images include the entire myocardial region, portions of the image that are not of interest may be eliminated from the image data. This may be performed manually by reviewing the images and placing a border or contour around a region of interest to delineate the area of interest in each image. In one embodiment, contours are drawn on an endocardial surface and an epicardial surface of a heart. In a particularly useful embodiment, a left ventricle (LV) or other heart chamber is imaged. In this case, the LV endocardial and epicardial surfaces in both MR and CT acquisitions are delineated. Contours may be drawn in all of the MR images and in approximately ten MPRs (multiple planar reformattings) taken from the CT volume. The region of interest may be delineated automatically by running an image-processing algorithm to differentiate the region of interest from other areas and properly identify the region of interest in each image by providing contours. This delineation may be performed to isolate an entire heart for imaging in accordance with the present invention. The boundary or contour of the area of interest is spatially defined relative to a coordinate system. In this way, each image may be correlated to the other images and a three dimensional image of the region of interest is obtained for both the CT and MR images.

In block 106, a model is provided which is to be fit to the MR image data. In one embodiment, the model is a digital model of a three dimensional heart with typical geometrical features and sizes. The model includes an endocardial surface and an epicardial surface, and preferably includes a mesh of nodes constrained by springs (virtual springs) to provide the capability to manipulate the model to conform to contours as will be described below. Models may be selected according to the circumstances. For example, a model may be employed for patients with enlarged hearts, or diseased hearts. Models employed may be generated as described in commonly assigned U.S. Pat. Nos. 5,293,770 and 5,883,630, both incorporated herein by reference. In block 107, contours generated for CT images or MR images are fit to the pre-existing heart model. In one embodiment, the endocardial and epicardial surfaces of the model are fit to the contours generated in block 104 for a heart. The model is capable of deforming to the contours in at least three ways: The model may rigidly translate and rotate. The model may adjust it global shape parameters (e.g., heart wall thickness, apex to base distance, blood pool depth, etc.). Once the global shape is settled, the model may act as a mesh of springs to conform to individual dips and bumps described by the MR contours. The new model that results will now be referred to as the MR model.

In block 108, a copy of the MR model is made. The copy of the MR model is fit to the CT contours provided in block 104. The endocardial and epicardial surfaces of the copy of the MR model are fit to the CT contours. The copy of the MR model is capable of deforming to the contours in at least three ways: The copy of the MR model may rigidly translate and rotate. The copy of the MR model may adjust it global shape parameters (e.g., heart wall thickness, apex to base distance, blood pool depth, etc.). Once the global shape is settled, the copy of the MR model may act as a mesh of springs to conform to individual dips and bumps described by the CT contours. The new model that results will now be referred to as the CT model.

In block 110, the MR model of block 106 is now fit to the CT model of block 108. The fitting process includes only translation and rotation to line up the two models. The translation and rotation information is recorded.

In block 112, the translation and recorded in block 110 are applied to the MR images to align the MR images to the CT images collected in blocks 100 and 102, respectively. This completes the registration of the MR images to CT images.

In block 114, volume determinations or other analysis is performed. For example, blood pool volume and myocardial tissue volume may be computed from either the MR or CT models by determining for each voxel in an acquisition, whether it lies inside or outside the model surface. Those voxels lying inside the endocardial surface contribute to the blood pool volume. Those voxels lying inside the epicardial surface but outside the endocardial surface contribute to the myocardial tissue volume. A voxel is a unit of graphic information that defines a point in three-dimensional space. Each vovel has a volume associated therewith, which can be added or subtracted to derive the needed volumes from the image.

Advantageously, the registered CT and MR images provide structural and functional information about internal organs, such as the heart. In one application, the registered image is employed to determine enfarcted heart tissue (MR image) along with positions of coronary arteries or other blood vessels in the heart (CT image). Advantageously, this information is made available on a single registered image volume. The present invention yields an invaluable tool for heart patients. In one useful embodiment, a diseased heart may be analyzed for blood vessels, which are candidates for bypass surgery. By providing the capability of viewing where dead or damaged tissues are located and the state of the blood vessels supplying (or not supplying) blood thereto, the registered images of the present invention provide a physician or health specialist with additional information not previously available.

Figure 2:
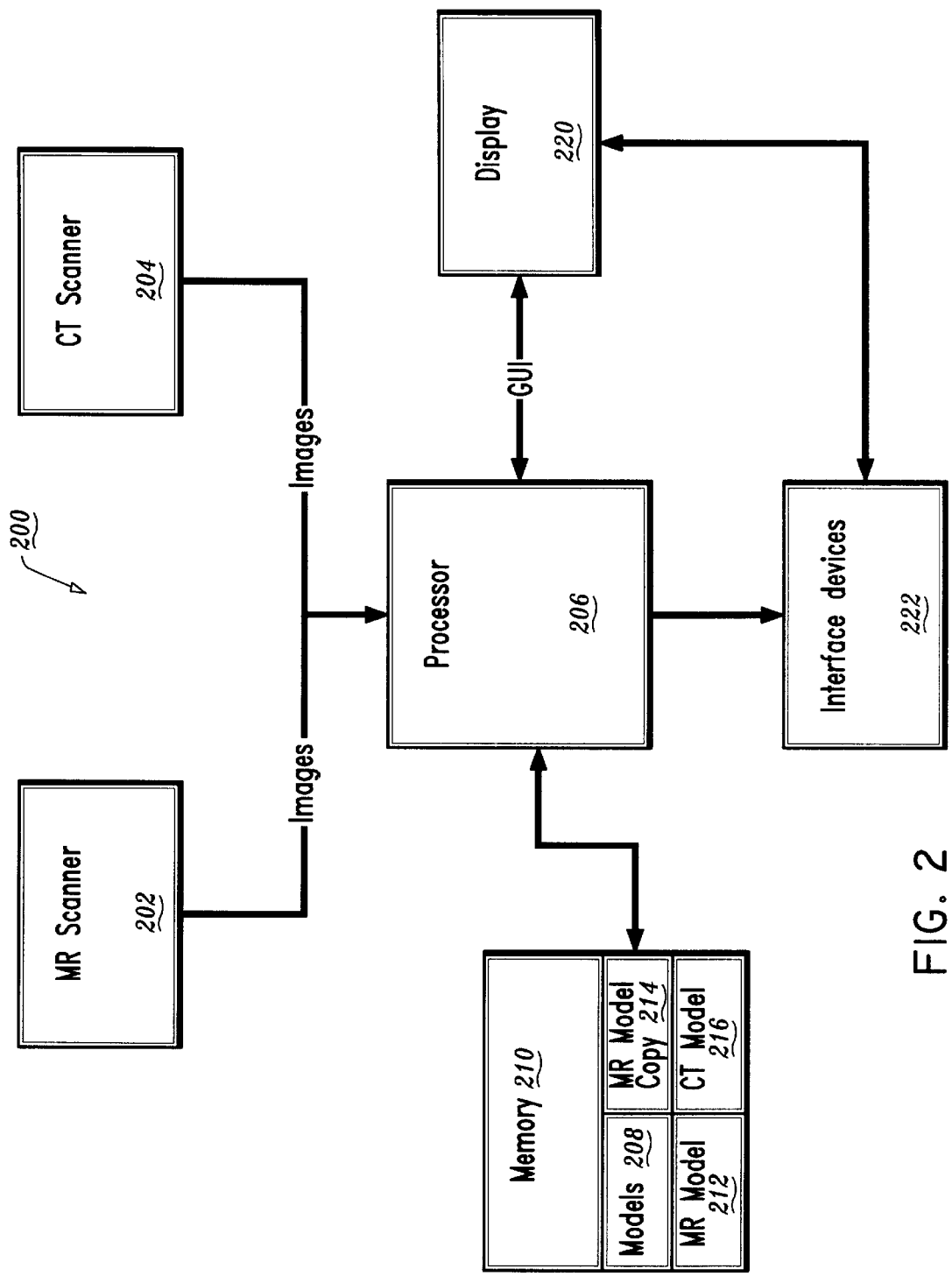
FIG. 2 is a block diagram of an illustrative system for registration of MR and CT images in accordance with the present invention.

Referring to FIG. 2, an illustrative apparatus 200 for registering CT and MR images is shown. MRI images are obtained for a subject by employing MRI scanner 202. CT images are obtained for a CT scanner 204 for the same subject. The CT images and the MR images may be acquired at different times at different locations. It is preferable, however, that the subject provide a relatively similar state. For example, the internal organ which is mapped should be in an approximately the same state for both imaging processes to ensure proper registration. The subject is preferably a heart, such as a human heart, however other organs of humans or animals may be included.

MR and CT data are input to a processor 206. Processor 206 may include a graphical user interface (GUI) which permits a user to manually draw a border or contour around a region of interest in the MR images and the CT images. Alternately, a segmentation algorithm may be employed to differentiate regions of interest and draw contours for MR and CT images automatically without user interaction. Segmentation algorithms known to those skilled in the art may be employed. Processor 206 is coupled to a memory 210 stores the image data as well as one or more models 208 to fit to the contours drawn in the CT and MR images. An MR model 212 and a copy 214 are generated by processor 206 and stored in memory 210. The MR model copy 214 is fit to CT images to form a CT model 216. The MR model 212 and the CT model 216 and then compared by processor 206 to determine rotational and translating differences. These differences are stored and the CT and MR models are adjusted to provide registration in accordance with the present invention.

A display 220 is included for displaying the images, providing interface information in the form of a graphical user interface (GUI) for drawing contours, etc. and displaying the registered image. An interface device or devices 222 are also included which may include a keyboard, mouse, or other devices known in the art.

ILLUSTRATIVE EXAMPLE

The present invention was employed to register CT and MR images of a human left ventricle. A patient with cardiovascular disease was imaged on a 1.5 T MR scanner (Symphony, Siemens Medical Systems, Erlangen, Germany) using a phased array body coil. A breath-hold 2D cine view-shared segmented FLASH sequence was used to evaluate wall motion. Short-axis 10 mm thick slices were obtained from the base to the apex of the heart with an in-plane interpolated image resolution equal to 1.17×1.17 $mm^2$. Fifteen cardiac phases were acquired during the cardiac cycle at each position. Three long-axis views were also obtained with an interpolated image resolution equal to 1.25×1.25 $mm^2$.

The patient was then imaged on a multi-slice CT scanner (SOMATOM Plus 4 Volume Zoom, Siemens Medical Systems, Erlangen, Germany). Retrospectively ECG-gated contrast-enhanced spiral scans were used to obtain CTA images of the coronary arteries. A 120 ml volume of Ultravist 240 (commercially available from, Berlex, Inc. of Wayne, N.J.) was administered as a contrast agent for highlighting certain regions of the images. Axial images were obtained 22 seconds after injection from the apex to the base of the heart with a scanner collimation of 4×1 mm. Complete coverage of the left ventricle was not possible because of limitations on scan time (<40 sec). Images were reconstructed from data collected during a 250 msec time window in late diastole. Images were reconstructed with a slice width of 1.25 mm and an inplane image resolution of 0.44×0.44 $mm^2$.

Referring to FIGS. 3–6, prior to registration, the LV endocardial and epicardial surfaces in both acquisitions were manually delineated. Contours were drawn in all of the MR images and in approximately ten MPRs (labeled 301 in FIGS. 3–6) taken from the CT volume. Note that the CT contours may not be closed due to the incomplete coverage of the LV in this example. Given the contours, the present invention is completely automatic and includes four stages depicted by FIGS. 3–6.

Figure 3:
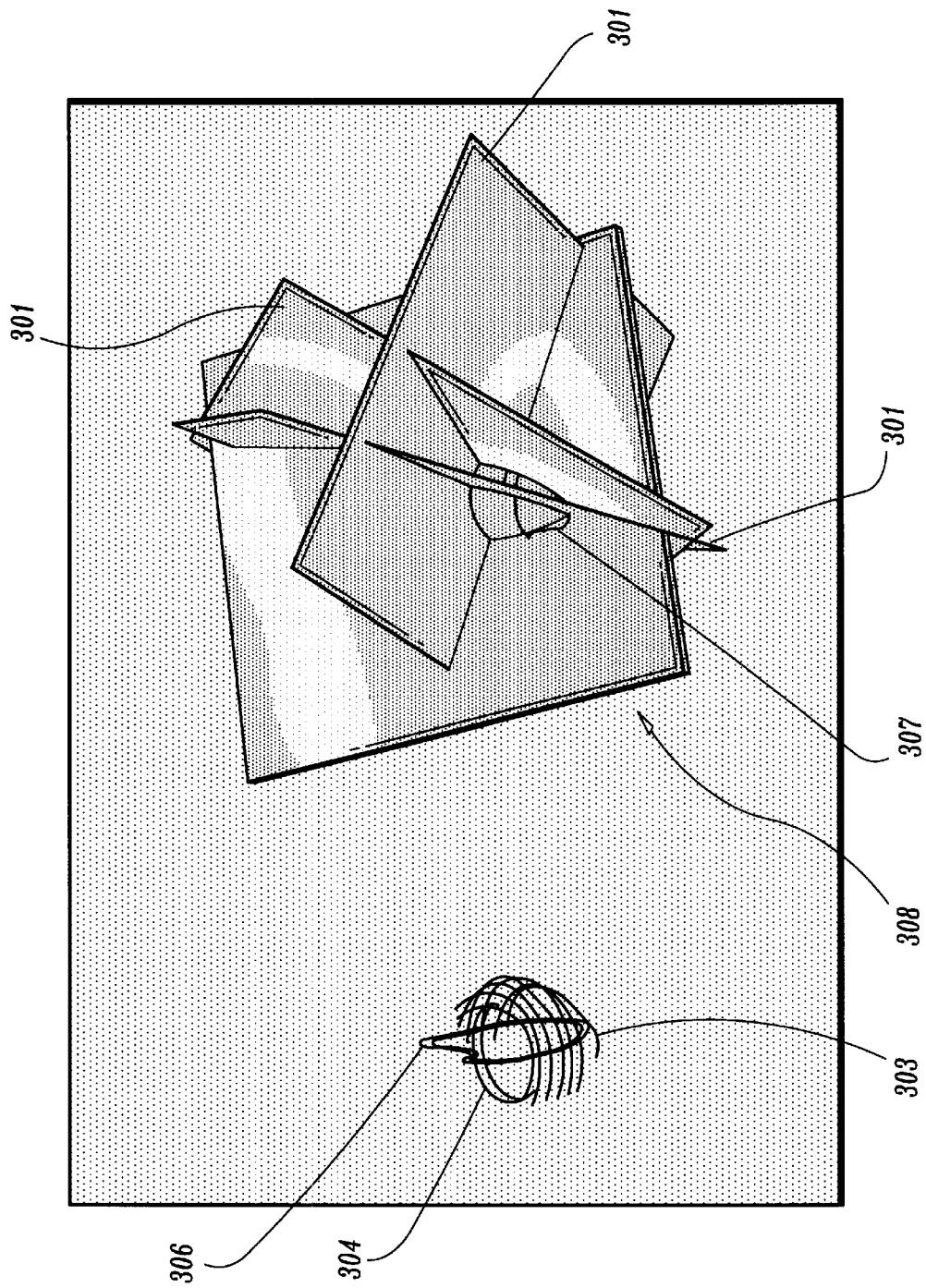
FIG. 3 depicts a pre-existing model fit to MR contours to form a MR model in accordance with the present invention.

As shown in FIG. 3, a pre-existing model 303 of an LV made up of an endocardial surface 304 and an epicardial surface 306 is fit to the contours drawn on the MR images 308. The model is capable of deforming to the contours in three ways: It may rigidly translate and rotate. It may adjust its global shape parameters (e.g., heart wall thickness, apex to base distance, blood pool depth). Once the global shape has settled, it may act as a mesh of springs to conform to the individual dips and bumps described by the contours. The resulting model is an MR Model 307.

Figure 4:
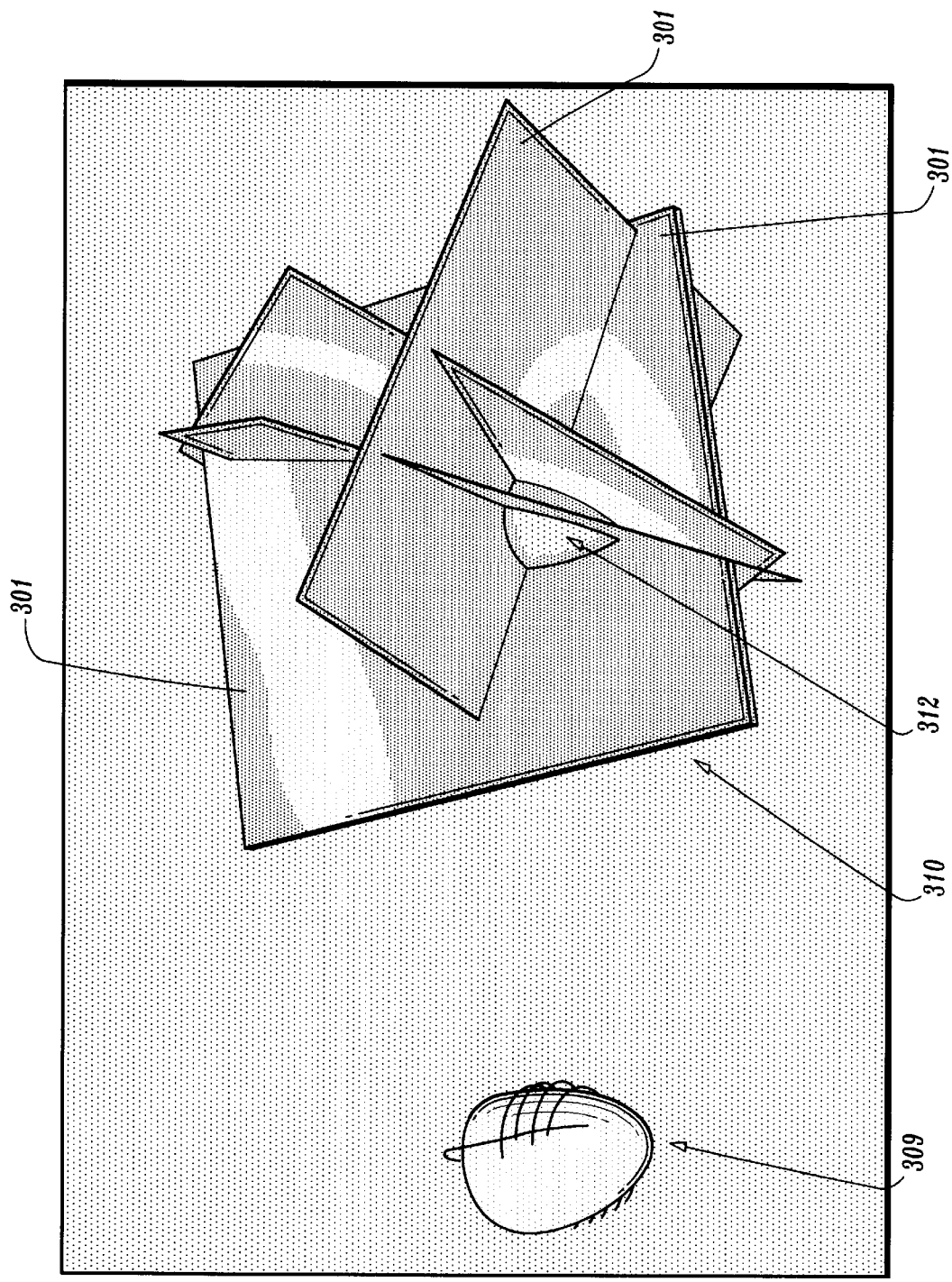
FIG. 4 depicts a copy of the MR model of FIG. 4 fit to contours in CT images to form a CT model in accordance with the present invention.
Figure 5:
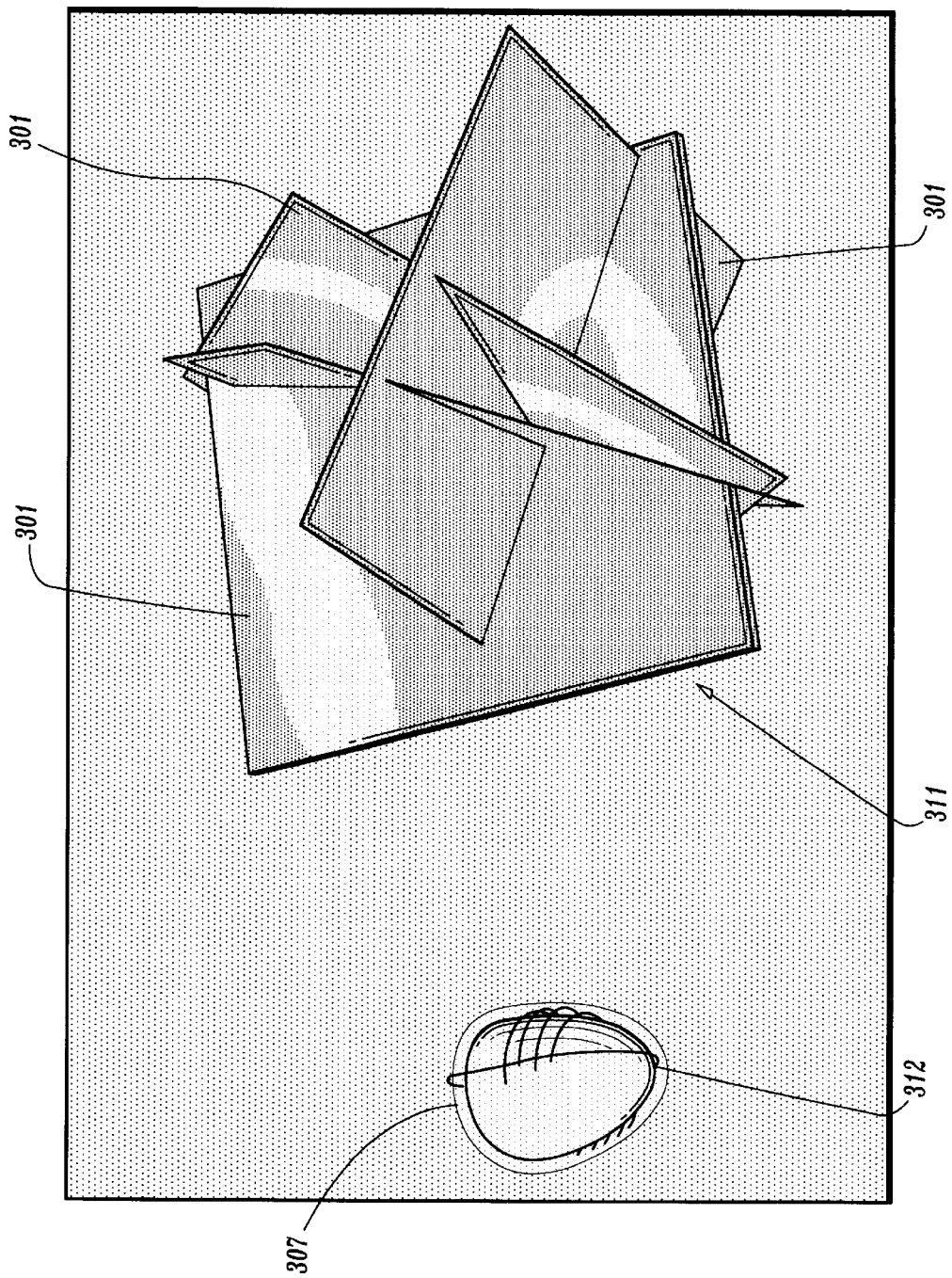
FIG. 5 depicts the MR model of FIG. 4 and the CT model of FIG. 5 translated and rotated to fit each other in accordance with the present invention.
Figure 6:
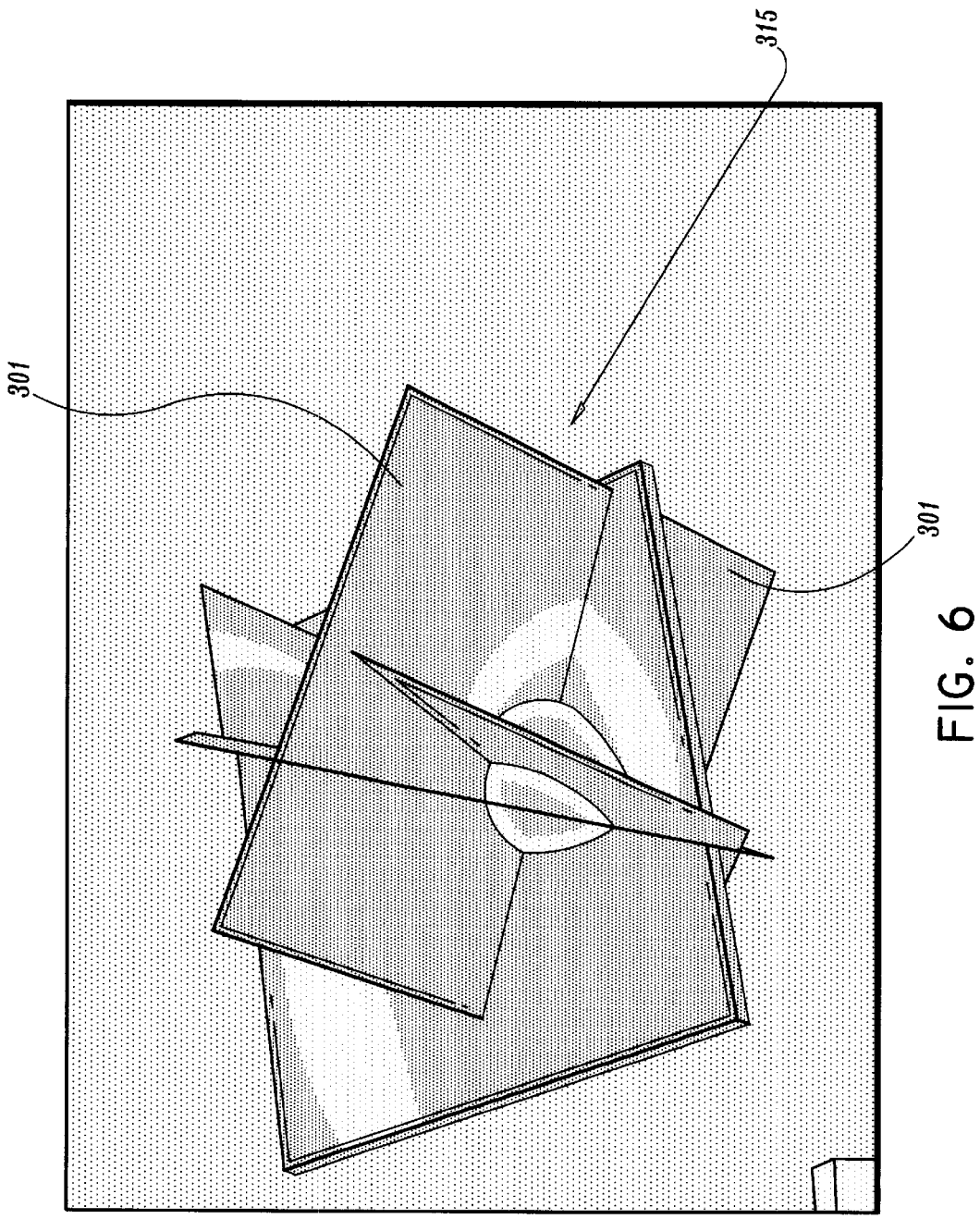
FIG. 6 depicts the MR images and the CT images translated and rotated to provide registration in accordance with the present invention.

As shown in FIG. 4, a copy 309 of the MR model is made. This model is fit to CT contours of image 310 using the same technique described for FIG. 3. This model is the CT Model 312. As shown in FIG. 5, the surface of MR model 307 is fit to the surface of CT model 312 via translation and rotation only to provide an aligned image 311. As shown in FIG. 6, the translation and rotation used in FIG. 5 are applied to the MR acquisition to align it to the CT acquisition completing the registration to form a complete model 315.

To exploit the information made available by registering the acquisitions, a good visualization environment should be used. In one embodiment, a variant of the FLY-THROUGH package, included in 3D VIRTUOSO, available from Siemens Aktiengesellschaft may be employed to fuse a volume rendered CTA acquisition with multiple MPRs taken from the MR acquisition.

The pre-existing model used for fitting to MR contours as shown in FIG. 3 serves two functions. First, because the shape of the pre-existing model is that of a typical LV, in those regions where there is no data, a reasonable hypothesis is available as to what the shape should be. This is contrasted with approaches for constructing a heart model where contours delineating the myocardial borders are simply "stitched" together. This might result in a flattened apex, for example, if only short axis contours are used. Second, in those regions where data is available, the present invention starts closer to the correct solution resulting in a faster, better fit. The contours of pre-existing model 303 are constrained by a mesh of springs (virtual springs); this mesh of spring constraints is carried through the other models as well.

In FIG. 4, a copy of the MR model is fit to the CT contours rather than the other way around (i.e., fitting a model to the CT contours, copying it, and fitting that model to the MR contours). This approach is taken because it is assumed that although the MR acquisition is sparse, the MR acquisition is more likely to completely cover the LV or other internal organ. The CT contours, as mentioned, may be incomplete. Thus, the MR model shape provides a good starting point for the fit to the CT contours. It is to be understood that the present invention may first fit the CT contours to the pre-existing model, if sufficient data is available.

In the example, the MR and CTA acquisitions were registered with an RMS error of <5 mm based on the distance between the MR and CT model surfaces. The volume of the blood pool taken from the MR model was 237 ml with a myocardial tissue volume of 232 ml. All the images shown include voxels which may be employed for further analysis of the models.

Figure 7:
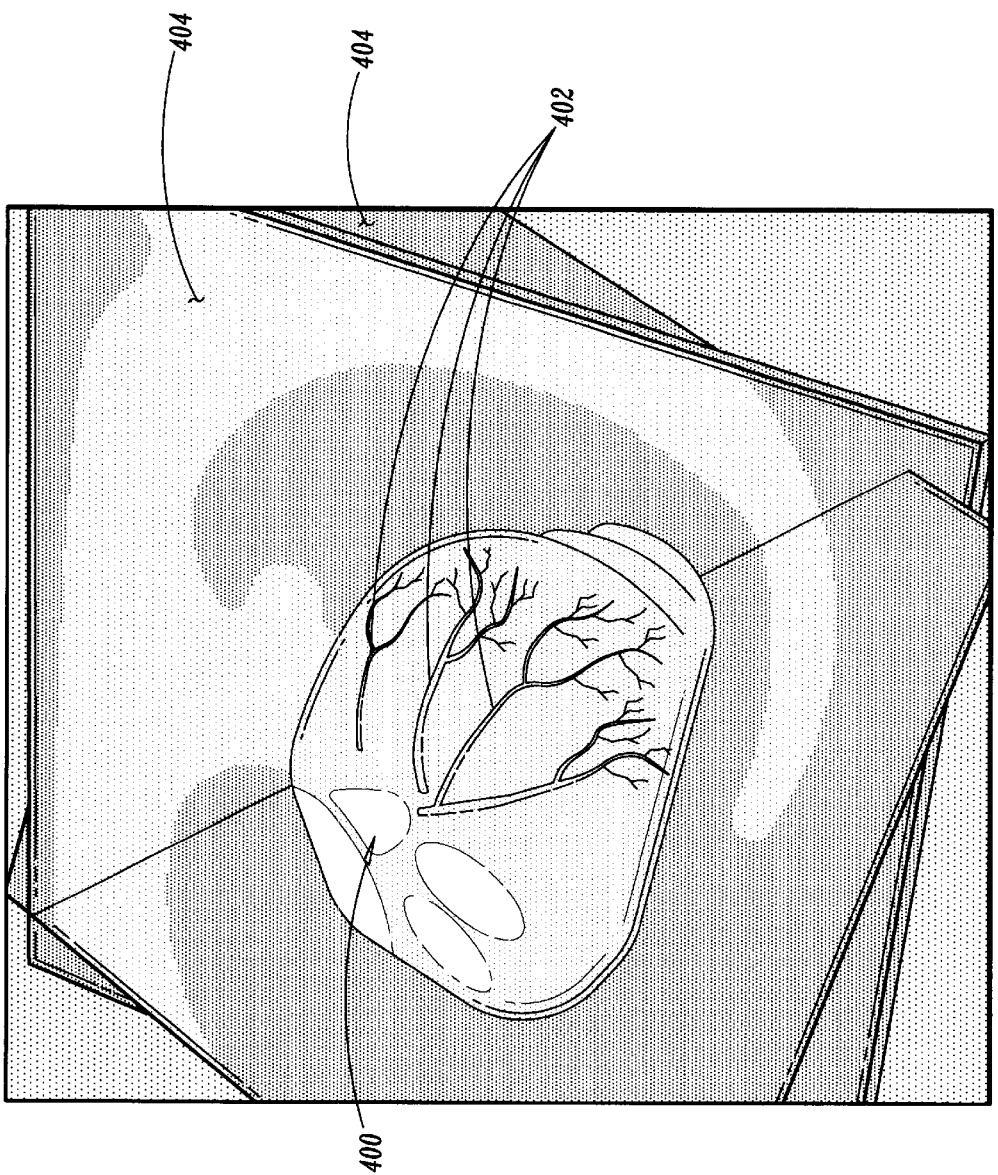
FIG. 7 depicts a volume rendered heart with coronary arteries visible which includes registered MR and CT images in accordance with the present invention.

Referring to FIG. 7, a volume rendered heart 400 from CTA data, highlighting coronary arteries 402, is shown with two MPR planes 404 taken from registered MR acquisition in accordance with the present invention.

Having described preferred embodiments model-based registration of cardiac CTA and MR acquisitions (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by letters patent is set forth in the appended claims.

What is claimed is:

1. A method for registration of magnetic resonance (MR) and computed topography (CT) images comprising the steps of:
providing MR images having a region of interest delineated by first contours;
providing CT images having the region of interest delineated by second contours;
providing a pre-existing model of the region of interest, the model representing an anatomical structure of interest;
fitting the pre-existing model to one of the first contours and the second contours to provide a first resultant model;
copying the first resultant model to provide a copied model;

fitting the copied model to the other of the first contours and the second contours to provide a second resultant model;

rotating and translating one of the first resultant model and the second resultant model to register the first resultant model and the second resultant model;

storing rotation and translation information; and applying the rotation and translation information to the images to provide registration between the MR images and the CT images.

2. The method as recited in claim 1, wherein the step of providing MR images having a region of interest delineated by first contours includes the step of providing MR images from a plurality of positions.

3. The method as recited in claim 1, wherein the step of providing MR images having a region of interest delineated by first contours includes the step of manually delineating the region of interest.

4. The method as recited in claim 1, wherein the step of providing MR images having a region of interest delineated by first contours includes the step of automatically delineating the region of interest by employing a segmentation algorithm.

5. The method as recited in claim 1, wherein the step of providing CT images having the region of interest delineated by second contours includes the step of manually delineating the region of interest.

6. The method as recited in claim 1, wherein the step of providing CT images having the region of interest delineated by second contours includes the step of automatically delineating the region of interest by employing a segmentation algorithm.

7. The method as recited in claim 1, wherein the MR images and CT images are acquired of a beating heart.

8. The method as recited in claim 7, wherein the CT images are acquired at a rate of greater than or equal to 8 images per second.

9. The method as recited in claim 1, wherein the step of fitting the pre-existing model to one of the first contours and the second contours to provide a first resultant model includes the steps of:

rigidly translating and rotating the pre-existing model;

adjusting global shape parameters of the pre-existing model; and conforming a mesh of springs of the pre-existing model to accommodate individual features described by one of the first and second contours.

10. The method as recited in claim 1, wherein the step of fitting the copied model includes the steps of:

rigidly translating and rotating the copied model;

adjusting global shape parameters of the copied model; and conforming a mesh of springs of the copied model to accommodate individual features described by the other of the first and second contours.

11. The method as recited in claim 1, further comprising the step of determining volumes of features in the MR and CT images by summing voxels in the first and second resultant models, respectively.

12. A method for registration of magnetic resonance (MR) and computed topography (CT) images comprising the steps of:

providing MR and CT images of a heart;

delineating an epicardial surface and an endocardial surface of the heart in the MR and CT images by designating contours on the images;

providing a pre-existing heart model;

fitting the pre-existing heart model to the contours in the MR images to provide an MR model;

copying the MR model to provide a copied MR model;

fitting the copied MR model to contours in the CT images to provide a CT model;

rotating and translating one of the MR model and the CT model to register the MR model and the CT model;

storing rotation and translation information; and applying the rotation and translation information to the MR and CT images to provide registration between the MR images and the CT images.

13. The method as recited in claim 12, wherein the step of delineating an epicardial surface and an endocardial surface of the heart includes the step of manually delineating the epicardial surface and the endocardial surface.

14. The method as recited in claim 12, wherein the step of delineating an epicardial surface and an endocardial surface of the heart includes the step of automatically delineating the epicardial surface and the endocardial surface by employing a segmentation algorithm.

15. The method as recited in claim 12, wherein the CT images are acquired at a rate of greater than or equal to 8 images per second.

16. The method as recited in claim 12, wherein the step of fitting the pre-existing model to the contours of the MR images includes the steps of:

rigidly translating and rotating the pre-existing model;

adjusting global shape parameters of the pre-existing model; and conforming a mesh of springs of the pre-existing model to accommodate individual features described by the contours in the MR images.

17. The method as recited in claim 12, wherein the step of fitting the copied MR model to the contours of the CT images includes the steps of:

rigidly translating and rotating the copied MR model;

adjusting global shape parameters of the copied MR model; and conforming a mesh of springs of the copied MR model to accommodate individual features described by the contours in the CT images.

18. The method as recited in claim 12, further comprising the step of determining volumes of a left ventricle blood pool and myocardium in the MR and CT images by summing voxels in the MR and CT models, respectively.

19. A program storage device readable by machine, tangibly embodying a program of instructions executable by the machine to perform method steps for registration of magnetic resonance (MR) and computed topography (CT) images, the method steps comprising:

providing MR and CT images of a heart;

delineating an epicardial surface and an endocardial surface of the heart in the MR and CT images by designating contours on the images;

providing a pre-existing heart model;

fitting the pre-existing heart model to the contours in the MR images to provide an MR model;

copying the MR model to provide a copied MR model;

fitting the copied MR model to contours in the CT images to provide a CT model;

rotating and translating one of the MR model and the CT model to register the MR model and the CT model;

storing rotation and translation information; and applying the rotation and translation information to the MR and CT images to provide registration between the MR images and the CT images.

20. The program storage device as recited in claim 19, wherein the step of delineating an epicardial surface and an endocardial surface of the heart includes the step of manually delineating the epicardial surface and the endocardial surface.

21. The program storage device as recited in claim 19, wherein the step of delineating an epicardial surface and an endocardial surface of the heart includes the step of automatically delineating the epicardial surface and the endocardial surface by employing a segmentation algorithm.

22. The program storage device as recited in claim 19, wherein the CT images are acquired at a rate of greater than or equal to 8 images per second.

23. The program storage device as recited in claim 19, wherein the step of fitting the pre-existing model to the contours of the MR images includes the steps of:

rigidly translating and rotating the pre-existing model;

adjusting global shape parameters of the pre-existing model; and conforming a mesh of springs of the pre-existing model to accommodate individual features described by the contours in the MR images.

24. The program storage device as recited in claim 19, wherein the step of fitting the copied MR model to the contours of the CT images includes the steps of:

rigidly translating and rotating the copied MR model;

adjusting global shape parameters of the copied MR model; and conforming a mesh of springs of the copied MR model to accommodate individual features described by the contours in the CT images.

25. The program storage device as recited in claim 19, further comprising the step of determining volumes in the MR and CT images by employing voxels in the MR and CT models, respectively.

26. A system for registration of magnetic resonance (MR) and computed topography (CT) images, comprising:

means for delineating an epicardial surface and an endocardial surface of a heart in MR and CT images by designating contours on the images;

a pre-existing heart model for fitting to the contours in the MR images to provide an MR model;

means for copying the MR model to provide a copied MR model, the copied MR model for fitting to contours in the CT images to provide a CT model;

means for rotating and translating the MR model and the CT model to register the MR model and the CT model;

a memory for storing rotation and translation information such that the rotation and translation information is applied to the MR and CT images to provide registration between the MR images and the CT images; and a display for viewing the registered MR images and CT images.

27. The system as recited in claim 26, wherein the means for delineating includes a mouse and a graphical user interface.

28. The system as recited in claim 26, wherein the means for copying includes a processor.

29. The system as recited in claim 26, wherein the means for rotating and translating includes a processor.

30. The system as recited in claim 26, wherein the pre-existing model includes a mesh of springs to accommodate individual features described by the contours in the MR images.

31. The system as recited in claim 26, wherein the copied MR model includes a mesh of springs of the copied MR model to accommodate individual features described by the contours in the CT images.

32. The system as recited in claim 26, wherein the MR and CT models include voxels for determining volumes in the MR and CT images.

* * * * *

UNITED STATES PATENT AND TRADEMARK OFFICE
CERTIFICATE OF CORRECTION

PATENT NO. : 6,563,941 B1 Page 1 of 1
DATED : May 13, 2003
INVENTOR(S) : Thomas O'Donnell, Alok Gupta and Shmuel Aharon It is certified that error appears in the above-identified patent and that said Letters Patent is hereby corrected as shown below:

<u>Title page,</u>
Item [75], Inventors, change "Schmuel Aharon" to -- Shmuel Aharon --.

Signed and Sealed this

Eighteenth Day of October, 2005

JON W. DUDAS
*Director of the United States Patent and Trademark Office*